United States Patent [19]

Avina et al.

[11] 4,190,870
[45] Feb. 26, 1980

[54] DISK DRIVE ASSEMBLY

[75] Inventors: Raymond Avina, San Jose; Patrick F. Merrell, San Martin, both of Calif.

[73] Assignee: International Business Machines Corporation, Armonk, N.Y.

[21] Appl. No.: 922,255

[22] Filed: Jul. 5, 1978

[51] Int. Cl.² .................... G11B 17/02; F16C 19/52
[52] U.S. Cl. .................................. 360/98; 308/36.1
[58] Field of Search .................. 360/98, 99; 308/36.1

[56] References Cited
U.S. PATENT DOCUMENTS

| | | | |
|---|---|---|---|
| 3,359,047 | 12/1967 | Andersen | 308/36 |
| 3,637,928 | 1/1972 | Poulett | 360/98 |
| 4,005,490 | 1/1977 | Duncan et al. | 360/97 |
| 4,008,492 | 2/1977 | Elsing | 360/98 |

Primary Examiner—Robert S. Tupper
Attorney, Agent, or Firm—Nathan N. Kallman

[57] ABSTRACT

A disk drive assembly includes a baseplate housing joined with front and rear covers to enclose a spindle that supports ball bearings and a hub for rotating a stack of magnetic disks. Voice coil actuators are disposed diametrically opposed but offset on each side of a plane bisecting the stack. Pressurizing ports, annular seals and a sealing cap prevent air contamination. Thermally conductive rings contacting the bearings and the housing compensate for temperature differential. Symmetry of the assembly in at least two planes ensures minimal vibration and resonance effects.

4 Claims, 3 Drawing Figures

DISK DRIVE ASSEMBLY

DESCRIPTION

TECHNICAL FIELD

This invention relates to disk storage, and in particular to a modular type disk drive assembly.

An object of this invention is to provide a disk drive assembly wherein improved alignment between accessing heads and data tracks on rotating disks for storing high density data is realized.

Another object of this invention is to provide an improved design of a disk storage apparatus wherein thermal and vibrational effects are minimized.

Another object is to provide a data storage apparatus in which air contamination within a sealed assembly is effectively reduced to ensure longer life of the enclosed components.

A further object is to provide a novel data storage assembly that achieves faster access to recorded data.

BACKGROUND ART

One well known design of a magnetic disk file data storage facility employs interchangeable, replaceable disk packs containing a plurality of magnetic disks. The disks are accessed by head arm assemblies mounted to a carriage that is actuated by a voice coil motor. The head assemblies, head carriage and voice coil motor are disposed in a housing external to the disk pack.

In this type of design, the spindle assembly is bolted to the baseplate. The interchangeable disk pack, which contains the hub and disks, is removably attached to one end of the spindle shaft, with the spindle drive pulley attached to the other end. Spindle bearings are located near the ends of the spindle housing, thus leaving a length of unsupported shaft. The head carriage assembly is mounted to the baseplate through ways and rails.

An advanced design of a disk file facility, as disclosed in U.S. Pat. No. 3,786,454, utilizes an interchangeable sealed cartridge that encloses magnetic disks, accessing head arm assemblies, a movable head carriage, a drive spindle for rotating the disks, and a common frame structure to maintain alignment between the cartridge components. This design provided an improvement over the aforementioned system in that the same accessing head is associated with the same disk surface so that the same relationship is maintained for the repetitive accessing accomplished between each head and disk surface. This arrangement allows increased track density as well as greater bit density on each disk surface thereby realizing improved data storage capacity while utilizing less physical space.

An improved disk storage apparatus is disclosed in U.S. Pat. No. 4,034,411 in which the disk storage apparatus comprises an enclosure within which the magnetic heads and disks are enclosed with the head carriage and a linear actuator coil, that is permanently attached to the carriage within the enclosure. In this apparatus, the generally difficult mechanical coupling required between the head carriage and the voice coil is alleviated, resulting in a decided improvement in alignment between the accessing heads and the rotating disks.

However, as more data is packed into lesser space in rotating disk file systems, the apparatus becomes more sensitive to mechanical resonances, thermal variations and contaminated air, which could lead to erroneous readout of data.

In copending application Ser. No. 838,346, filed Sept. 30, 1977, entitled "Disk File with Symmetrical Hollow Base," and assigned to the same assignee, there is disclosed a disk file in which voice coil actuators are mounted within a symmetrical base. A neutral plane divides opposing walls of the base into symmetrical parts. A stack of disks is coupled for rotation to a spindle, with the spindle axis being perpendicular to the neutral plane, while the center of gravity of the disk stack is substantially coincident with the neutral plane. When two voice coils are used, they are disposed diametrically about the disk stack and are offset equal distances from the neutral plane.

The present application discloses and claims an improved implementation of the type of disk file disclosed in copending application Ser. No. 838,346.

BRIEF DESCRIPTION OF THE DRAWINGS

The invention will be described in detail with reference to the drawings in which.

Similar reference numerals refer to similar elements throughout the drawing.

DISCLOSURE OF THE INVENTION

Figure 1:
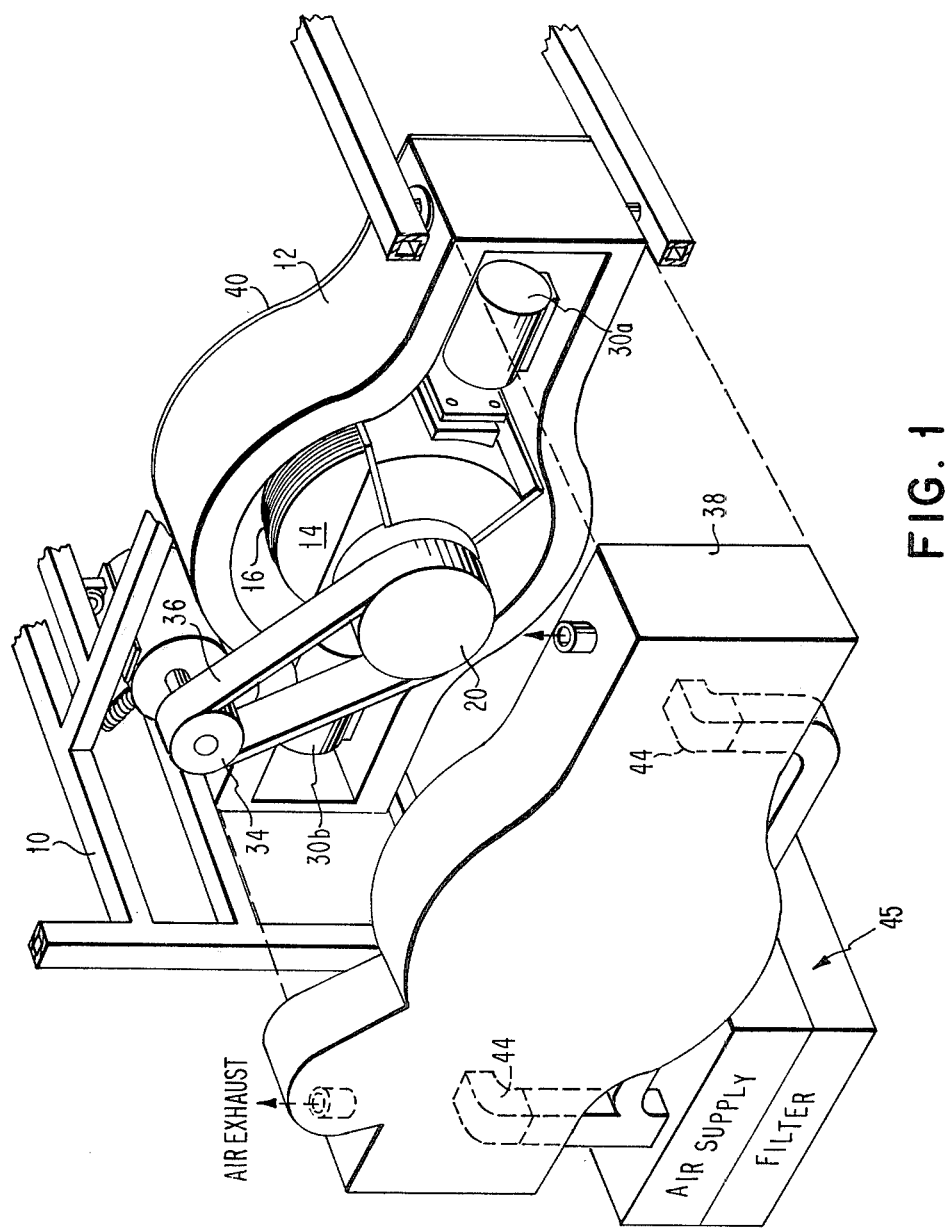
FIG. 1 is a perspective view of the disk drive, in accordance with this invention.
Figure 2:
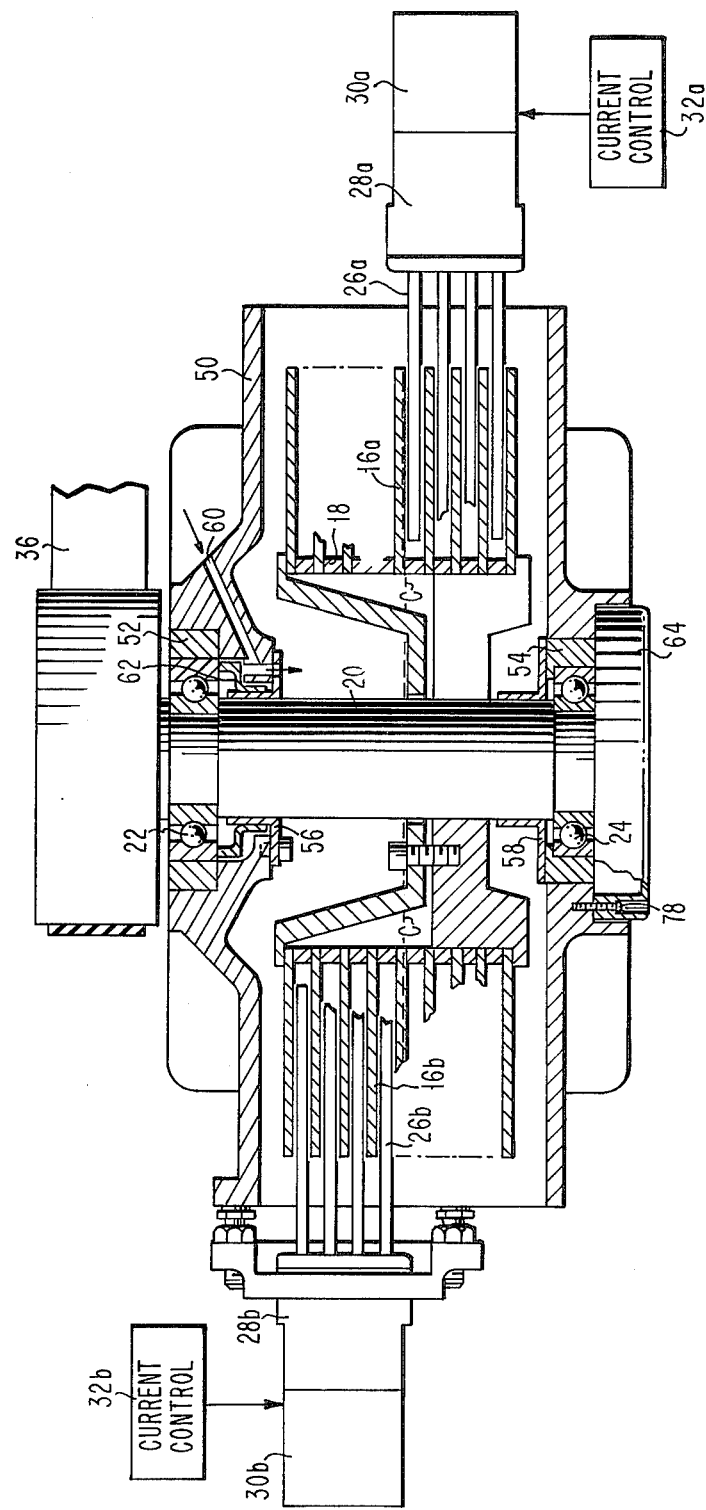
FIG. 2 is a top view, partly in section, of the disk drive of this invention.

With reference to FIGS. 1 and 2, a magnetic disk drive apparatus assembly comprises a housing frame 10 to which is mounted a hollow baseplate 12 having a bowtie type configuration. Within the baseplate is a head/disk assembly (HDA) 14 that includes a plurality of data storage disks 16a, b mounted on a hub 18, which in turn, is seated on a rotary spindle 20. Ball bearing assemblies 22 and 24 are disposed respectively at each end of the spindle in a symmetrical arrangement. The HDA 14 also includes a multiplicity of transducing head assemblies 26a, b, each assembly associated with a storage surface of a disk 16a, b, except for the two outermost surfaces of the disks 16. The head assemblies 26a, b are of the accessing type and are coupled respectively to voice coil motors 28a, b. The voice coils are of the long coil, short gap type and are located to be in a magnetic flux field provided by annular permanent magnet structures 30a, b, as is well known in the art. The magnet structures 30 are fixed to the baseplate 12 whereas the voice coils are movable relative to the disk surfaces. Separate current control means 32a, b are provided to pass a current of predetermined direction and magnitude to the respective voice coils 28a, b to enable rapid movement of the coils 28 and magnetic heads 26 to selected data tracks on selected disk surfaces. Each voice coil 28a or 28b may be moved independently of the other in response to its associated control means 32a or 32b. The voice coil motor 28a accesses the portion of the disks 16a which are to one side of a center line C—C bisecting the disk assembly and the spindle 20. Similarly, the voice coil motor 28b accesses those disk surfaces 16b that are disposed on the other side of the center line C—C. Thus, the voice coil motors 28a and 28b are displaced axially and 180° apart relative to the spindle. Each disk group 16a and 16b has a dedicated servo disk surface and associated servo head to provide precise track seek and track follow operations.

The rotary spindle 20 is coupled to a drive motor 34 through a pulley belt 36 for rotating the storage disks 16 at a nominal speed. The motor 34 is bolted to the frame 10. The baseplate 12 is enclosed by a front cover 38 and rear cover 40 to form a sealed, airtight enclosure. Air supply and filtration means 42 provide ultra-clean air through channels 44 to the HDA to remove contaminants and to regulate temperature.

In the preferred embodiment of this invention, the HDA housing 50 is preferably formed from a lightweight aluminum to reduce overall weight effectively. The spindle shaft 20 is made from stainless steel, and the ball bearings 22 and 24 are of steel composition. With this arrangement, temperature changes that occur during operation of the disk drive will cause expansion or contraction of the mechanical parts. Because the thermal coefficients of expansion vary for aluminum and steel, the clearance between the bearing outer race and the bearing bore increases. Consequently, there is a tendency for the spindle shaft 20 to tilt and misalign relative to its central axis, which is orthogonal to the central plane C—C bisecting the disk array. Misalignment of the spindle shaft causes misregistration of the heads with their associated disk surfaces, leading to erroneous readout of data.

To solve this problem, stainless steel rings 52 and 54 are placed between the aluminum housing 50 and the respective steel ball bearings 22 and 24. The steel rings 52, 54 are about 15 millimeters thick, by way of example. The coefficient of thermal expansion of the steel material of the rings are of such value, so that expansion and contraction differentials between the aluminum housing bearing bore and the steel bearings outer race are effectively minimized. Thus, the problems associated with bearing shift due to thermal variations are alleviated.

Another feature of this invention is the provision of ultra clean air and the prevention of intake of contaminated air into the head-disk housing area. To prevent contaminated ambient air from entering the housing 50 through the bearings 22, 24, the housing includes annular seals 56 and 58 (FIG. 2).

During operation of the disk drive, the rotation of the spindle 20 and hub 18 and disks 16 changes the pressure within the HDA housing 50 to a level less than atmospheric. On the other hand, the baseplate enclosure 12 surrounding the housing 50 is pressurized above atmospheric with ultra clean air derived from the filtered air source 42. The differential in pressure is such that the annular seals 56, 58 are not totally effective in preventing contaminated air from entering the housing 50.

Figure 3:
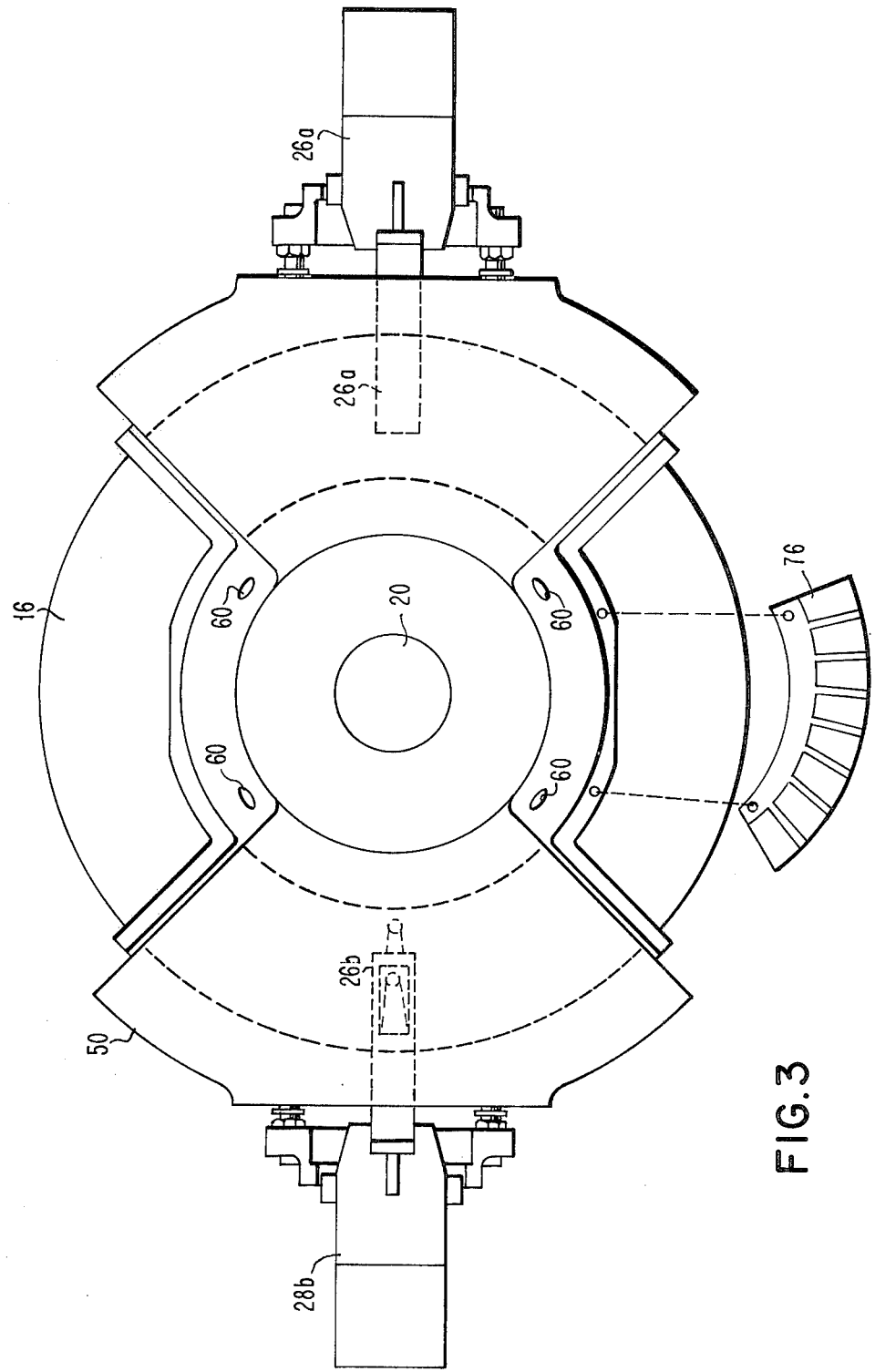
FIG. 3 is a front plan view of the disk drive assembly.

In this embodiment of the invention, means are provided for preventing contaminated air from entering the HDA housing 50 and baseplate enclosure 12. To this end, a series of pressurizing ports 60 (FIG. 3) are disposed circumferentially at one end of the housing 50 facing the air supply 42. The ports 60 allow the cavity between the annular seal 56 and the bearing 22 to become pressurized to the same level as the baseplate enclosure 12. The total cross-sectional area of the ports 60 is greater than the annular area defined between the inner diameter of a preload plate 62 and the outer diameter of the hub 18 plus the annular area between the outer race of the bearing 22 and the housing bore. The preload plate 62 is a cartridge type element formed with apertures that enable loading of the bearings 22, 24 during assembly of the HDA housing 50.

The resultant air flow developed by the presence of the pressurizing ports 60 is predominantly through the annular seal 56 with a relatively small amount of air flowing through the bearing 22. Thus, contaminated air is effectively blocked from passing through the bearing, thereby realizing longer life for the bearing lubricant and the bearing itself.

Another feature of the embodiment of this invention is the use of a sealing cap 64 which establishes a very small free volume between the annular seal 58 and the sealing cap. The sealing cap is attached to the housing 50 by screws 78. As the spindle, hub and disks begin to rotate and start up, the air in the free volume is evacuated, due to the negative pressure generated by the rotating parts. The evacuation proceeds until a state of equilibrium is reached. Consequently, with steady state rotation during operation of the disk drive, no additional air enters the free volume space, and there is no air flow across the bearing 24. Thus, the life of the bearing and its lubricant are extended, and less maintenance and repair are required.

An additional feature of this invention is the availability of employing fixed heads with the uppermost and lowermost disk surfaces. To this end, a semicircular plate 76 supporting racks of fixed heads positioned in a stepped or spiraling fashion may be inserted above the outer disk surface and fastened to the HDA housing. Means for loading the fixed heads into transducing relation with the data tracks may be provided. Preferably, the same electronics used for the read and write functions of the accessing heads would be employed for the fixed heads.

By virtue of the substantially symmetrical configuration that is provided, vibrational and resonance effects are effectively minimized. The hub 18 is centrally located and attached to the spindle shaft 20 between the spindle bearings 22 and 24. The spindle bearings are attached directly to the spindle shaft. The voice coil motor permanent magnets 30A, B are attached to the baseplate 12. The voice coil motors are staggered 180° apart, and the actuator coils 28A, B are attached with four bolts to the HDA housing 50. The housing is centered in three planes within the baseplate 12 and attached by bolts in the centerline of the housing 50. In this manner, there is virtually minimal tilt of the hub spindle assembly such that the disks are properly aligned respective to the accessing heads.

There has been disclosed herein a novel disk drive assembly having a symmetrical arrangement with offset actuators that afford independent accessing respectively to disk groups disposed on either side of a centerline representing the center of gravity of the head/disk assembly. Compensation for temperature variations is provided to prevent spindle tilt and head to disk misalignment. Airflow and air pressure are effectively controlled to eliminate contamination and to minimize vibration and resonance effects. By virtue of the configuration defined in this application, a more compact disk drive which can process higher density data in more closely spaced data tracks is made possible.

Having thus described my invention, what I claim as new, and desire to secure by Letters Patent is:

1. A disk storage assembly comprising:
   a multiplicity of magnetic disks;
   a number of movable magnetic heads for accessing associated surfaces of said disks;
   an air-tight housing enclosing said magnetic heads and disks;

a rotary spindle disposed centrally within said housing and having a longitudinal axis about which said spindle rotates;

means for mounting said disks to said spindle in an array along said axis;

means for controlling air flow into and within said housing to prevent contaminated air from circulating in said housing;

first ball bearing means located at one end of said spindle, and second ball bearing means located at the other end of said spindle; and metal rings affixed between said housing and said spindle bearing means, wherein the coefficient of thermal expansion of said rings has a value substantially that of said spindle bearings.

2. A disk storage assembly as in claim 1, wherein said bearing means are made of steel, and said housing is made of aluminum.

3. A disk storage assembly as in claim 1 wherein said means for controlling air flow comprises pressurizing ports.

4. A disk storage assembly as in claim 1, including a sealing cap disposed on one section of said housing for sealing at least one bearing assembly from ambient air.

* * * * *